United States Patent

[11] 3,628,860

[72] Inventor Masaya Ogawa
 Osaka, Japan
[21] Appl. No. 790,311
[22] Filed Jan. 10, 1969
[45] Patented Dec. 21, 1971
[73] Assignee Minoltacamera Kabushiki Kaisha
 Osaka, Japan
[32] Priority Jan. 31, 1968
[33] Japan
[31] 43/6460

[54] HEAT-FUSING APPARATUS IN ELECTROSTATIC COPIER
 3 Claims, 3 Drawing Figs.

[52] U.S. Cl. ................................................ 355/10,
 219/216, 219/388, 250/65.1, 250/219
[51] Int. Cl. .................................................. G03g 9/04
[50] Field of Search ........................................ 355/3, 10;
 219/388, 216; 250/65.1, 219

[56] References Cited
 UNITED STATES PATENTS

| | | | |
|---|---|---|---|
| 3,379,878 | 4/1968 | Limberger ................... | 250/65.1 |
| 3,501,635 | 3/1970 | Springer et al. ............. | 219/216 |
| 3,078,589 | 2/1963 | Carlson ...................... | 355/10 X |
| 3,187,162 | 6/1965 | Toku Hojo et al. .......... | 355/3 X |
| 3,219,794 | 11/1965 | Mindell et al. ............... | 219/216 |
| 3,440,944 | 4/1969 | Endermann et al. .......... | 95/89 |
| 3,492,458 | 1/1970 | White et al. .................. | 355/10 |

Primary Examiner—Samuel S. Matthews
Assistant Examiner—Michael Harris
Attorney—Mason, Fenwick & Lawrence ABSTRACT: A copying apparatus is provided in which an image-fixing hot air blower normally has a heating unit maintained at a lower temperature by thermostatic means in the image-fixing area with an overriding control circuit bypassing the thermostat means in response to initiation of a copying cycle to increase the temperature of the heating element to its operating range.

HEAT-FUSING APPARATUS IN ELECTROSTATIC COPIER

The heat-fusing apparatus in an electrostatic copier generally comprises a heater disposed within a blast duct and employing an electrical resistor such as a nichrome wire for heating the blast passing through the duct, whereby the copy processed by a developing device may be subjected to the blast thus heated. Since a considerable period of time is required for the heated blast to reach the temperature required for heat-fusing after the electrostatic copier is initiated into operation, it is a common practice that the current is always passed through the heater. However, the current always flowing through the heater may give rise to a dangerous situation such as overheating of the main body of the electrostatic copier, so that a thermostat is generally provided in the electrical circuit of the heater to maintain the temperature of the blast within a certain range. In accordance with such a structure, on the other hand, the moment the current supply to the heater is interrupted, the blast passing through the duct serves to cool the heater as well as the heat-fusing apparatus, with the result that the heat-fusing apparatus is rapidly cooled as a whole and the processed copy, while passing through the heat-fusing apparatus, may be subjected to marked variation of the blast temperature due to the operation of the thermostat, or in case a copy happens to pass through the heat-fusing apparatus while the heater is turned off by the thermostat, the copy may be discharged from the copier before satisfactory heat-fusing operation is given to the copy. Due to such difficulties, it was conventionally impossible to step up the speed of feeding the electrophotographic paper above a certain level and accordingly to improve the efficiency of the copying operation.

An object of the present invention is to provide a heat-fusing apparatus in which the temperature of the blast to be heated by the heater is kept at a level lower than the temperature required for heat-fusing while the operation of feeding the electrostatic paper is not performed, but when the paper feeding operation is initiated, the electrical circuit of the heater is automatically actuated into operation so that a desired heated blast may be obtained within a required period of time, whereby the main body of the copier is protected against overheating and the time for heat-fusing the copy is reduced.

In accordance with the present invention, the interior of the heat-fusing apparatus in the electrostatic copier is preheated to a temperature set by the thermostat and upon photographing of the original sheet being initiated, a microswitch is actuated independently of the switching action of the thermostat to close the circuit of the heater and to thereby elevate the temperature of the heated blast to obtain a heated blast suitable for satisfactory heat-fusing, and when the original sheet has been photographed, the contact of the microswitch is opened simultaneously therewith to control the temperature of the heated blast to a lower level by the thermostat.

Other features of the present invention will become apparent from the following description of the embodiment with reference to the accompanying drawings, in which.

Figure 1:
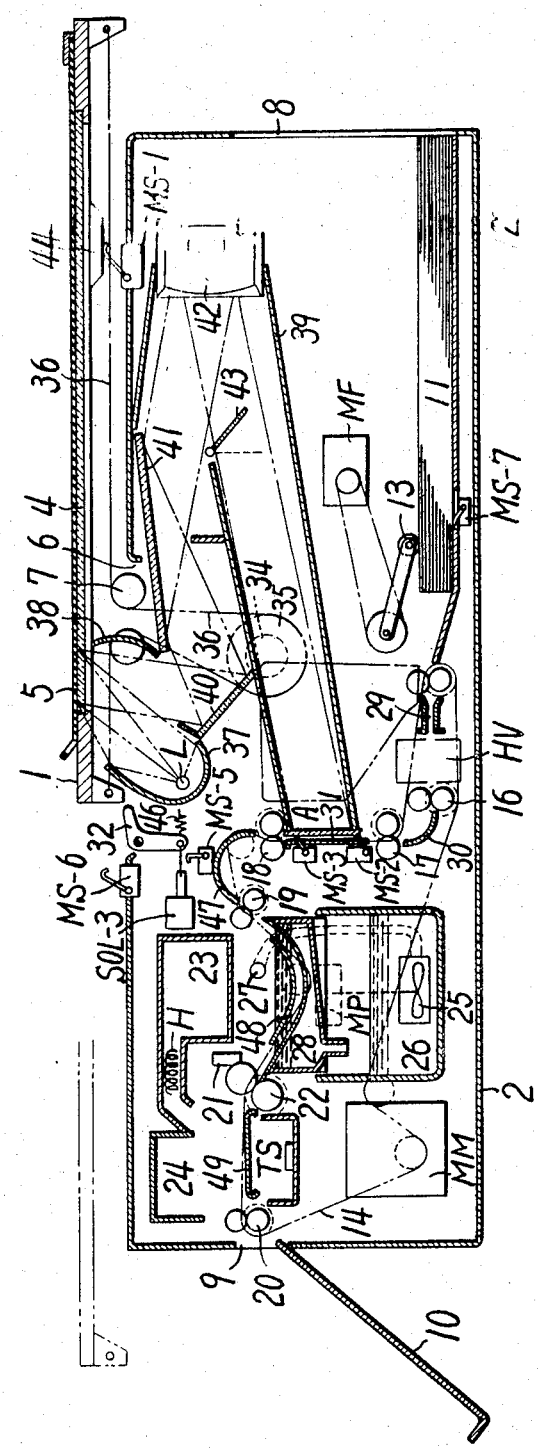
FIG. 1 is a front view in vertical section showing an embodiment of a copier.

Referring to the drawing, the numeral 1 designates a document station to be guided on a main body 2 along a guide rail 3 and adapted for a reciprocating movement toward the right and left in FIG. 1. As already known, the document station 1 includes a glass plate 4 for inspecting the original sheet and a document cover 5. In the upper surface of the main body is an opening 6 for illuminating the document and for a chain wheel 7 for driving the document station 1. The right side surface is formed with an inlet 8 for feeding electrophotographic paper and the left side surface is provided with an inlet 9 for discharging processed copies and a copy receiver 10.

Figure 3:
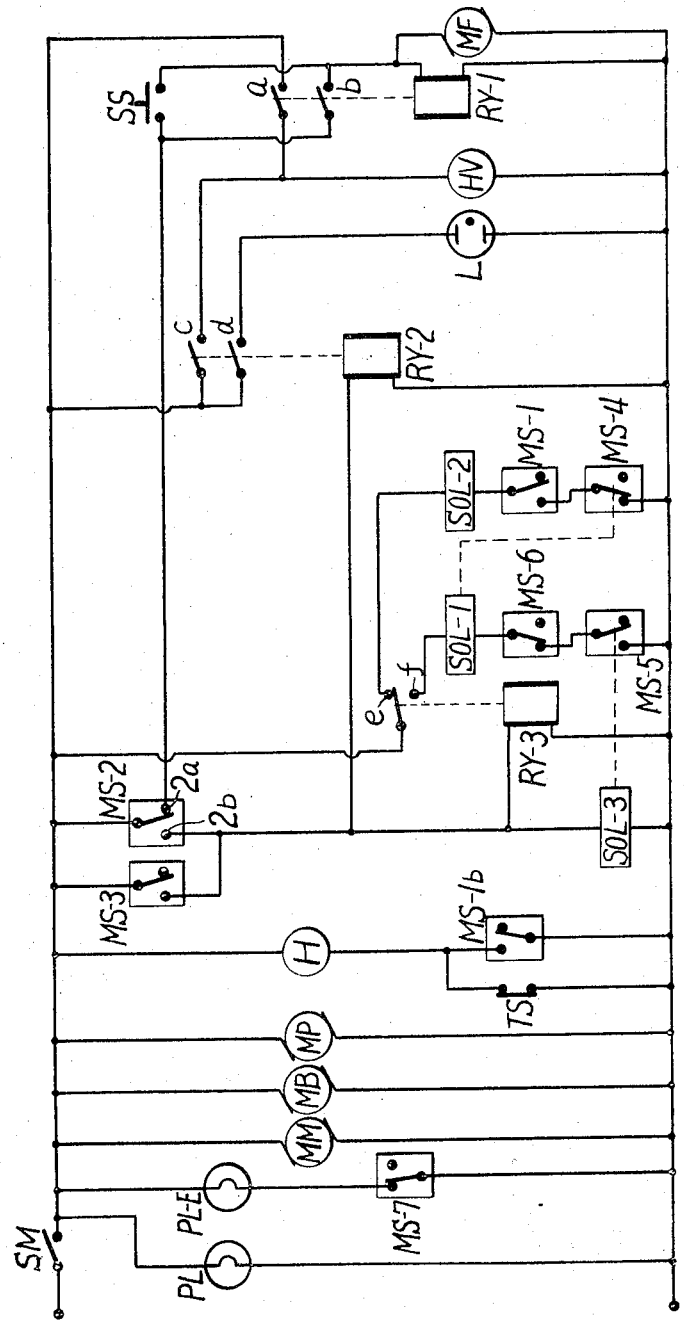
FIG. 3 is a diagram showing an electrical control circuit.

When a pile of electrophotographic paper is placed through the inlet 8 on a paper table 12 within the main frame 2, a microswitch (MS-7) inserted in the circuit for a pilot lamp (PL-E) shown in FIG. 3 is opened. On the top surface of the pile of electrophotographic paper 11 at the left end is disposed a feed roller 13 to be driven by a feed motor (MF).

When a main switch (SM) is turned on (see FIGS. 1 and 3), a pilot lamp (PL) is lighted, and a main motor (MM) is actuated to drive a chain mechanism 14 which further drives paper driving rollers 15, 16, 17, 18, 19 and 20 and squeeze rollers 22 which are kept clean by a cleaner 21. Furthermore, a fan motor (MB) is rotated to drive a fan (not shown) and send a blast through a duct 23 into a heat-fusing portion 24. A pump motor (MP) is also rotated to drive a pump 25 and supply the developer within a tank 26 into a developing device 28 through a conduit 27 and further back into the tank 26. A heater (H) whose circuit is opened or closed by means of a thermostat (TS) is charged to heat the blast supplied to the heat-fusing portion 24 through a duct 23. When the temperature of the heated blast exceeds a certain level, the thermostat is actuated to open the circuit of the heater (H), while in case the temperature lowers below a certain level, the circuit is closed, thus keeping the temperature of the heated blast within a definite range. At the entrance of a path 31 provided in the exposure station (A), there is disposed a microswitch (MS-1) which, when no electrophotographic paper 11 is in transit, is adapted to close a contact (2a) connected with a start switch (SS) while leaving the outer contact (2b) open and which, when the electrophotographic paper 11 passes, gets the contact (2a) opened and the contact (2b) closed.

The circuit shown in FIG. 3 will be described in accordance with the order of the operations. When the start switch (SS) is turned on, the circuit of the feed motor (MF) is closed to drive the feed roller 13, whereupon an uppermost sheet in the pile of electrophotographic paper 11 is fed onto the feed rollers 15 driven by the main motor (MM), and at the same time a relay (RY-1) which is connected in parallel with the feed motor (MF) is energized to close the contacts (a) and (b) and generate high voltage in a charging device (HV) through the contact (a). Through the contact (b) and contact (2a) of the microswitch (MS-2), the circuits involving the feed motor (MF) and relay (RY-1) are closed, and even when the start switch (SS) is turned off, the current continuously flows through the feed motor (MF), relay (RY-1) and charging device (HV). The electrophotographic paper 11 fed onto the driving rollers 15 is driven by the rollers 15 and delivered from a guide 29 to the charging device (HV) where it is sensitized. Driven along the driving rollers 16, guide 30 and driving rollers 17, the sheet reaches the entrance of the path 31 in the exposure station (A). At the entrance of the path 31 of the exposure station (A), there is provided the microswitch (MS-2) as aforementioned. When the electrophotographic paper 11 approaching the path 31 comes into contact with the contacting member of the microswitch (MS-2), the switch (MS-2) opens its contact (2 a) and closes the contact (2b), thus serving as a changeover switch.

When the contact (2a) of the microswitch (MS-2) is opened, the circuits including the relay (RY-1) and feed motor (MF) are opened thereby deenergizing the feed motor (MF), and the feed roller 13 is therefore halted on the next sheet of the electrophotographic paper 11. Since the relay also gets deenergized, the contacts (a) and (b) are opened. Although the supply of current to the charging device (HV) is consequently interrupted for a moment, the microswitch (MS-2) which closes contact (2b) permits the relay (RY-2) to be energized to close the contacts (c) and (d), so that the current supply to the charging device (HV) is resumed through the contact (c) to get the electrophotographic paper 11 sensitized. The lamp (L) is also turned on through the contact (d).

When the contact (2b) of the microswitch (MS-2) is closed, a stopper release solenoid (SOL-3) and relay (RY-3) are energized. The stopper release solenoid (SOL-3) turns the stopper positioned at the left end of the document station 1 clockwise in FIG. 1 to thereby enable the document station 1 to move leftward while associating the tail end of the stopper 32 with a microswitch (MS-5) to get its contact closed.

Figure 2:
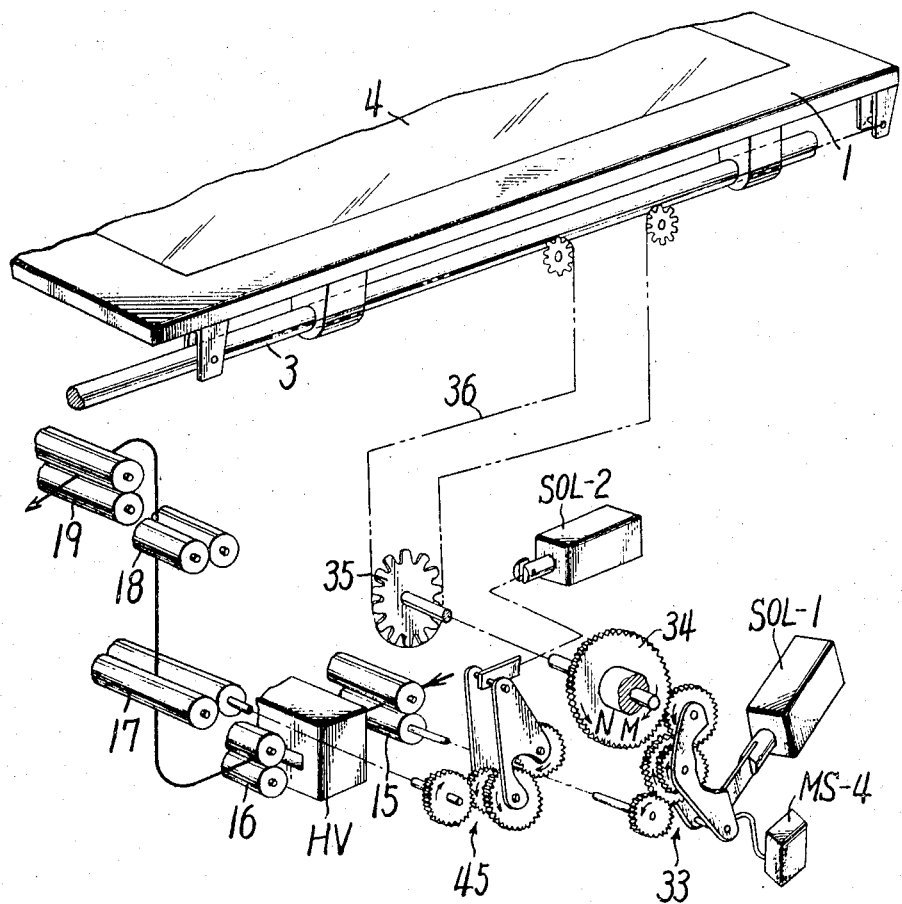
FIG. 2 is a schematic perspective view of a clutch mechanism for controlling the reciprocation of a document station.

Upon being energized as above-described, the relay (RY-3) opens the contact (e) and closes the contact (f). Thus, when the contact (f) is closed and the contact of the microswitch (MS-5) is closed, an actuating solenoid (SOL-1) is brought into energization through a microswitch (MS-6). (This microswitch is a safety switch which is adapted to be opened only when the document station 1 overruns leftward in FIG. 1 and which otherwise keeps the contact always closed.) The actuating solenoid (SOL-1), when energized (see FIG. 2), brings a group of feed gears 33 meshing with a gear at one end of the driving roller 15 into meshing engagement with a clutch gear 34 and rotates the clutch gear 34 in the direction of an arrow (M) to thereby drive the document station 1 leftward in FIG. 1 by means of a chain sprocket 35 and chain 36 for driving the document station. Furthermore simultaneously with the meshing engagement of the above-mentioned feed gear group 33, the contact of a microswitch (MS-4) inserted in the circuit of the return solenoid (SOL-2) to be described later is opened.

The lamp (L) has already been turned on upon the operation of the aforementioned relay (RY-2). As shown in FIG. 1 the lamp illuminates the original sheet from under the document station 1 by means of light reflectors 37 and 38, the light being adapted to strike the exposure station (A) by means of reflecting mirrors 40 and 41, a mirror lens 42 and exposure control plate 43 which are disposed in a dark box 39 of the optical system to form an image of the original sheet on the electrophotographic paper 11 passing through the path 31 in the exposure station (A) and effect exposure.

The under surface of the document station 1 is provided with an actuating member 44 for the contacting member of a microswitch (MS-). While the actuating member 44 is in contact with the microswitch (MS-1), namely only while the document station 1 stays at the right end in FIG. 1, the contact of the microswitch (MS-1) is kept open, and upon the document station 1 being initiated into leftward travel, the contact is closed, while when the document station is completely returned, the contact is brought into an open position again. The gear ratio of the group of feed gears 33 is so determined that the speed of feeding the electrophotographic paper 11 may be synchronized with that of the leftward travel of the document station 1.

At the terminal end of the path 31 in the exposure station (A) there is disposed another microswitch (MS-3) which is so adapted that, when the forward end of the electrophotographic paper 11 which has been exposed to the light as aforementioned is brought into contact with the contacting member of the microswitch (MS-3), the contact of the switch may be thereby closed. As shown in FIG. 3, the microswitch (MS-3) is arranged in parallel with the microswitch (MS-2). By the contact being closed, current is supplied to the relays (RY-2), (RY-3), and stopper release solenoid (SOL-3) to actuate respective mechanisms described above.

When the electrophotographic paper 11 has been exposed and the rear end thereof has left the contacting member of the microswitch (MS-3) after passing through the exposure station (A), the contact of the microswitch (MS-3) is opened to terminate the supply of current to the relays (RY-2), (RY-3) and stopper release solenoid (SOL-3). Accordingly, the relay (RY-2) opens its contacts (c) and (d) to stop the supply of current to the charging device (HV) and turn off the lamp (L). The relay (RY-3) gets deenergized to open the contact (f) and close the contact (e) and the current supply to the actuating solenoid (SOL-1) is thereby terminated, while the stopper release solenoid opens the contact of the microswitch (MS-5) through the stopper 32.

The actuating solenoid (SOL-1), upon being deenergized (see FIGS. 2 and 3), moves the feed gear group 33 out of the meshing engagement with the clutch gear 34 to thereby halt the leftward travel of the document station 1 and closes the contact of the microswitch (MS-4). Since the contact of the microswitch (MS-1) has been closed by the leftward travel of the document station 1 as aforementioned, the return solenoid (SOL-2) is energized by the contact (e) of the relay (RY-3) which is brought into closed position. By bringing a group of return gears 45 meshing with a gear on one end of a driving roller 17 which is driven by the main motor (MM) into meshing engagement with a clutch gear 34, the clutch gear is rotated in the direction of an arrow (N) to drive the document station 1 rightward in FIG. 1 by means of a clutch sprocket 35 and chain 36 for driving the document station. When the document station 1 has been returned to the right end in FIG. 1, the actuating member under the document station 1 comes into contact with the contacting member of the microswitch (MS-1) to open the contact of the microswitch (MS-1), so that the circuit of the return solenoid (SOL-2) is opened and the solenoid is deenergized. The return gear group 45 is consequently moved out of meshing engagement with the clutch gear 34, whereby the document station 1 is brought to a halt. Although the left end of the document station 1, during the returning movement of the station, contacts the stopper 32, trouble-free return is ensured since a spring 46 is acting on the stopper 32 as illustrated.

While the operations described are carried out, the electrophotographic paper, passing along the driving rollers 18, guide 47, driving rollers 19 and a guide 48 in the developing device, is brought into contact with the developer, which turns the sensitized image aforementioned into a visible image. With developer squeezed by squeeze rollers 22, it is sent into the heat-fusing portion 24 to be heat-fused with a blast which is supplied through the duct 23 and heated by the heater (H). Guided by a guide 49 and driven by driving rollers 20, the sheet is delivered onto the copy receiver 10 through the discharge outlet 9.

The temperature of the blast heated by the heater (H) is controlled by the switching action of the thermostat (TS). Therefore, in case it happens that the electrophotographic paper 11 is fed into the heat-fusing portion while the electrical circuit of the heater (H) is kept open by the thermostat, the blast sent out of the duct rapidly cools the heater and the heat-fusing portion, thereby resulting in insufficient heat-fusing of the paper 11, hence the speed of feeding the electrophotographic paper can not be stepped up greatly.

According to the present invention, the electrical circuit of the heater (H) is brought into a closed position independently of the switching action of the thermostat (TS) the moment the document station is initiated into operation, so that by the time the electrophotographic paper, subjected to development in the developing device 28 after passing through the exposure station (A), is delivered into the heat-fusing portion 24, the temperature of the blast is raised to a sufficiently high level by the heater (H), and accordingly the electrophotographic paper can be heat-fused within an extremely short period of time. In case the feeding speed of the driving rollers associated with the main motor and returning speed of the document station 1 are so determined that the electrophotographic paper may complete passage through the heat-fusing portion simultaneously with the completion of returning movement of the document station, the electrostatic copier can be adapted to make copies at a desired high speed. The electrophotographic paper is thus ensured against improper heat-fusing which is the case with a conventional apparatus. Upon the document station being completely returned, the contact of the microswitch (MS-1b), now opened, brings the heater (H) under the control of the thermostat (TS) for the switching of the electrical circuit. Since this control is carried out within a lower range of temperature than is required for heat-fusing by the heated blast, the interior of the electrostatic copier is completely free from overheating. In addition, with the temperature of the heated blast maintained by the thermostat (TS) within a certain range, excessive colling of the interior of the heat-fusing portion can be prevented, which ensures rapid elevation of the temperature of the blast to be effected when the document station is initiated into subsequent copying operation. Thus, efficiency of copying operation can be remarkably improved.

For the convenience of explanation, the description has been made as to an electrostatic copier comprising a document station 1 which is adapted for reciprocating movement. However, instead of closing the electrical circuit of the heater (H) independently of the thermostat (TS) and simultaneously with the initiation of the movement of the document station, the electrical circuit of the heater (H) may be closed upon the electrophotographic paper being started, or instead of subjecting the electrical circuit of the heater (H) to the control by the thermostat (TS) when the document station is returned to the original position, the heater section may be provided with a microswitch by which, when the electrophotographic paper has completely been passed through the heat-fusing portion, the electrical circuit of the heater may be brought under the control of the thermostat. It should be understood that these modifications are also included within the scope of the present invention.

I claim:

1. A copying apparatus of the type in which images are heat-fused in an image-fixing station, said apparatus including duct means from which a blast of heated air is ejected into said image-fixing station, a source of electrical voltage, electrical heater means in said duct connectable to said source of electrical voltage for heating the blast of air ejected from said duct, thermostat means disposed in said image-fixing station and connected to said heater means and said source of electrical voltage for normally maintaining the temperature of said air blast at a temperature lower than the heat-fusion temperature of the copying paper employed in said apparatus but substantially higher than ambient temperature, and control circuit means responsive to the initiation of a copying operation for temporarily bypassing said thermostat to provide increased voltage to said heater means in response to the initiation of a copying cycle to cause the air blast from said duct to be at a temperature sufficiently high for heat-fusing an image on copy paper subsequently fed to said image-fixing station in response to the initiation of the printing cycle so that the temperature of the blast is at a sufficiently high level upon arrival of said copy paper at the image-fixing station to fuse the image on said copy paper.

2. The invention of claim 1 wherein said copying apparatus includes a reciprocal document supporting station and said control circuit includes microswitch means operable by initial movement of said reciprocal document station during a copying operation for connecting said source of electrical voltage to said heater means.

3. The invention of claim 2 wherein said microswitch means is connected in parallel with said thermostat means to said electrical heating means.

* * * * *